US010005319B2

(12) United States Patent
Steenson

(10) Patent No.: US 10,005,319 B2
(45) Date of Patent: Jun. 26, 2018

(54) CASTER YOKE FOR MANUFACTURE OF A SET OF WHEELED CASTER ASSEMBLIES

(71) Applicant: Darcor Limited, Toronto, Ontario (CA)

(72) Inventor: Adrian Steenson, Mississauga (CA)

(73) Assignee: Darcor Limited, Toronto, Ontario (CA)

( * ) Notice: Subject to any disclaimer, the term of this patent is extended or adjusted under 35 U.S.C. 154(b) by 0 days. days.

(21) Appl. No.: 15/415,366

(22) Filed: Jan. 25, 2017

(65) Prior Publication Data

US 2017/0129282 A1     May 11, 2017

Related U.S. Application Data

(63) Continuation of application No. 14/611,664, filed on Feb. 2, 2015.

(51) Int. Cl.
*B60B 33/00* (2006.01)
*A47B 91/00* (2006.01)
*B60B 33/02* (2006.01)

(52) U.S. Cl.
CPC ...... *B60B 33/0057* (2013.01); *B60B 33/0002* (2013.01); *B60B 33/0042* (2013.01); *B60B 33/0068* (2013.01); *B60B 33/0086* (2013.01); *B60B 33/02* (2013.01); *B60B 2900/112* (2013.01); *B60B 2900/116* (2013.01)

(58) Field of Classification Search
CPC ... Y10T 16/201; Y10T 16/202; Y10T 16/203; Y10T 16/204; Y10T 16/1853; Y10T 16/195; B60B 33/0078; B60B 33/0086; B60B 33/02; B60B 33/021; B60B 33/023; B60B 33/025; B60B 33/0042; B60B 33/0057; B60B 2301/046; B60B 2301/0463; B60B 2301/0465; B60B 2301/0467; A61G 2007/0528
See application file for complete search history.

(56) References Cited

U.S. PATENT DOCUMENTS

| | | | | |
|---|---|---|---|---|
| 4,024,601 A | * | 5/1977 | Harlang | B60B 33/00 16/31 R |
| 4,290,166 A | * | 9/1981 | Melara | B60B 33/0028 16/18 CG |
| 4,399,586 A | * | 8/1983 | McCarroll | B60B 33/0002 16/31 R |
| 4,649,596 A | * | 3/1987 | Kassai | B60B 33/0078 16/35 R |

(Continued)

*Primary Examiner* — Chuck Mah
(74) *Attorney, Agent, or Firm* — Patrick J. Hofbauer

(57) ABSTRACT

A caster yoke for use in the manufacture of a set of wheeled caster assemblies wherein each caster assembly of the set of caster assemblies is capable of having unique functional capabilities relative to each other caster assembly of the set arising from different combinations of caster components (selected from a set of pre-determined of caster components) being mountable on each respective caster yoke of the set of wheeled caster assemblies. To this end, the caster yoke is provided with all of the mounting features necessary to selectively mount all of the respective caster components of the pre-determined set on the caster yoke, such that the same form of caster yoke may be used without modification as a mounting frame to create a set of caster assemblies having different functionalities, significantly reducing design, production and inventory costs for the set of caster assemblies.

12 Claims, 16 Drawing Sheets

(56) References Cited

U.S. PATENT DOCUMENTS

| | | | | |
|---|---|---|---|---|
| 5,119,525 A * | 6/1992 | Melara | ................ | B60B 33/0028 16/18 R |
| 5,368,133 A * | 11/1994 | Yang | ................... | B60B 33/0042 16/35 R |
| 5,943,734 A * | 8/1999 | Pearce | ..................... | A61G 5/00 16/18 R |
| 5,988,323 A * | 11/1999 | Chu | ....................... | B60B 33/021 16/35 R |
| 6,360,851 B1 * | 3/2002 | Yang | ................... | B60B 33/0028 16/35 R |
| 6,615,448 B2 * | 9/2003 | Melara | ................ | B60B 33/0007 16/35 R |
| 6,662,404 B1 * | 12/2003 | Stroh | ..................... | B60B 33/0002 16/35 R |
| 6,810,560 B1 * | 11/2004 | Tsai | .................... | B60B 33/0021 16/20 |
| 6,834,746 B1 * | 12/2004 | Lin | ..................... | B60B 33/0018 16/35 R |
| 7,698,780 B2 * | 4/2010 | Yan | ..................... | B60B 33/0021 16/18 CG |
| 7,707,686 B2 * | 5/2010 | Chou | .................. | B60B 33/0002 16/35 R |
| 8,087,127 B2 * | 1/2012 | Dayt | .................. | B60B 33/0021 16/21 |
| 2003/0132065 A1 * | 7/2003 | Suzuki | ............... | B60B 33/0007 188/1.12 |
| 2006/0254867 A1 * | 11/2006 | Yan | ..................... | B60B 33/0021 188/73.1 |
| 2007/0289098 A1 * | 12/2007 | Tsai | ..................... | B60B 33/0042 16/35 R |
| 2009/0113671 A1 * | 5/2009 | Chu | .................... | B60B 33/0002 16/35 R |
| 2015/0040352 A1 * | 2/2015 | Tsai | ................... | B60B 33/0086 16/35 R |
| 2015/0239291 A1 * | 8/2015 | Jie | ....................... | B60B 33/0042 16/35 R |

* cited by examiner

CASTER YOKE FOR MANUFACTURE OF A SET OF WHEELED CASTER ASSEMBLIES

CROSS-REFERENCE TO RELATED APPLICATIONS

This application is a continuation-in-part application, under 35 U.S.C. § 120, that claims the benefit of U.S. patent application Ser. No. 14/611,664 filed on Feb. 2, 2015 and entitled "CASTER YOKE FOR MANUFACTURE OF A SET OF WHEELED CASTER ASSEMBLIES", the entire contents of which prior application are hereby incorporated by reference herein.

TECHNICAL FIELD

The present invention relates to the field of caster assemblies and more particularly to a caster yoke that can be used to manufacture a set of caster assemblies with selected members of the set having different caster components mounted on the yoke to provide for different functional capabilities without the need to modify the structure of the caster yoke or of the different caster components mounted thereon.

BACKGROUND OF THE INVENTION

Caster assemblies are generally well known in the art. Such wheeled casters are attached to a base or to the bottom of an object such as a bed, a stretcher, a gurney, a chair, a large piece of medical diagnostic equipment, a palette, a wagon, a cart, and the like. Caster assemblies typically have a single wheel or paired dual wheels and are configured to provide translation (rolling movement) of the object along a surface or the ground (once attached to the object). In some configurations, the wheel(s) of the wheeled caster assembly may be fixed in a single orientation relative to the attached object to provide motion in a single forward and backward direction. In other configurations, the caster assembly includes a swivel brake lock that allows the caster assembly to rotate about a vertical axis. If all caster assemblies attached to the object are of this configuration, the object to which the caster assembly is attached is able to move in a lateral as well as a forward and backward motion. Different configurations are also well known with combinations of fixed and swivel-enabled caster assemblies attached to a single object.

Wheel brake lock and swivel brake lock assemblies for casters are also well known and have been provided in a variety of forms for many years. A wheel brake lock assembly is typically used to stop the motion of the wheel(s) of a wheel assembly, such that the wheel(s) is/are no longer able to rotate about a respective wheel axis. Wheel brake lock assemblies are often engaged when a user wishes the object to remain in a fixed position. If the caster assembly has a swivel brake lock function, the object may still be able to rotate about the wheel-braked locked caster assembly eventhough the wheel(s) themselves is/are not able to rotate.

Similarly, swivel brake lock assemblies have been designed to lock a swivel-enabled caster assembly in a fixed orientation about its vertical swivel axis, such that the caster assembly is unable to swivel about that vertical axis. Swivel brake lock assemblies are commonly used when a user wishes to translate the object in a fixed direction, such as forward or backwards relative to the object, without having to exert the additional effort to steer in that direction. As only the swiveling about the vertical axis is locked when a swivel brake lock is engaged, the wheel(s) of the caster assembly is/are still free to rotate about the wheel axis. Furthermore, objects having fixed caster assemblies oriented in the same direction will generally travel in a straight line.

Additionally, a combination of a wheel brake lock and swivel brake lock assemblies in a caster assembly are known to simultaneously engage a wheel brake lock and a swivel brake lock using a single stopping actuator. With such a single actuator, the user is able with a single motion able to arrest the rotation of the caster assembly's wheel(s) about the horizontal wheel axis and to stop the rotation of the swivel about the vertical swivel axis.

While various combinations of these wheel and swivel brake assemblies and their associated functionalities are required in the art, each combination typically presents a challenge to combine together into a caster assembly that meets the space, actuation and service requirements of modern equipment manufacturers who incorporate caster assemblies into their products. As a result, it is required, in many cases, to custom design the various components of a caster assembly to meet the unique functional requirements of such manufacturers. That is, for example, a wheeled caster assembly required to have both a wheel brake lock assembly and a swivel brake lock assembly will, in the prior art, be structured differently from a caster assembly having only a wheel brake lock assembly, or only a swivel brake lock assembly. This is particularly problematic in relation to the yoke of the caster assembly, which yoke is the central support frame of a caster assembly on which most, if not all, of the other components of the caster assembly are mounted. To effectively carry out these support and mounting functions, most caster yokes used for heavy duty equipment applications, such as X-ray machines and CT scanners, are themselves typically large and robust, often being constructed as a monolithic metal fabrication or casting. As such, changing the design of a caster yoke in response to the need to mount more, or different, caster components thereon typically results in significant re-design and re-tooling costs.

Further, prior art caster assemblies, particularly larger caster assemblies such as mentioned in the previous paragraph, often have a molded plastic trim cover assembly mounted on, or over, the caster yoke to improve its aesthetic appearance and/or to ease its maintenance and/or cleaning requirements. Accordingly, performance requirement changes made by equipment manufacturers to the caster assemblies they order for their equipment may not only require significant changes to the structural parts and components used to manufacture the caster assemblies, but may additionally require significant re-design of the associated trim cover assemblies to accommodate their mounting on a revised caster assembly, which, in turn, may result in significant additional re-design and tooling costs.

One prior art wheeled caster assembly having caster components used to construct a unique caster configuration having a wheel brake lock assembly, a fixed-direction swivel lock assembly, and a full-directional swivel lock assembly is disclosed in U.S. Pat. No. 8,424,158 (Steenson), which patent is hereby incorporated by reference. The wheeled caster assembly disclosed in U.S. Pat. No. 8,424,158 includes a caster yoke and a cam assembly operable in at least three operational (functional) states (modes). The cam assembly may include an actuating mechanism for operating the cam assembly, a swivel lever mechanism and a brake lever mechanism in communication with a cam. When in a first operational (functional) state (mode), the wheel rotates freely and the caster yoke swivels freely. When in a second operational (functional) state (mode), a first swivel brake is engaged by the swivel lever mechanism to lock the caster yoke in a predetermined orientation while the wheel is allowed to rotate freely. When in a third operational (functional) state (mode), a wheel brake lock is engaged by the brake lever mechanism to stop the wheel from rotating freely, and a second swivel brake lock is simultaneously engaged to stop the caster yoke from swiveling. While operatively effective in its various operational (functional) states (modes), it will be appreciated by those skilled in the art that the Steenson prior art caster assembly is both complex and expensive to manufacture. Most importantly, such high levels of complexity and expense cannot be justified for many applications where less operational (functional) states (modes) are required. Moreover, the Steenson prior art caster assembly is not readily adaptable to the production of caster assemblies having less operational (functional) states (modes) without extensive redesign of the various caster components utilized therein, including the caster yoke, and of the associated tooling, facilities and other resources necessary to produce assemble and inventory such components. As a consequence, in order for a caster manufacturer to be able to offer its customers a full model line (set) of casters capable of offering all of the three different operational (functional) capabilities described above in their various combinations and permutations, it would be necessary for such manufacturer to construct and inventory as many as 9 different unique caster models, each having a plurality of parts, including caster yokes, that are potentially unique to each model of the line (set).

Reducing the cost of designing and manufacturing caster assemblies having different functionalities and inventorying the numerous different caster components used in their production represents an ongoing challenge for manufacturing efficiencies in response to continuing customer demands for reduced costs. Accordingly, there remains a need in the art for improved caster assemblies that may be produced in sets with different members of the set having different functional capabilities and without the need to re-design the various caster components to accommodate such differences in functionality.

SUMMARY OF THE INVENTION

There is thus provided, in accordance with an aspect of the present invention, a caster yoke that may be used to manufacture a set of caster assemblies wherein each wheeled caster assembly of the set is adapted and otherwise configured to have all available caster components selectively mounted thereon, either alone or in various combinations with one another, so as to lend variable functional capabilities to each caster assembly of the set, without the need to alter the form or structure of the caster yoke, or of said available caster components selectively mounted thereon.

In accordance with another aspect of the present invention, there is provided a set of caster assemblies for attachment to the base of an object to facilitate movement thereof. Each caster assembly of the set has a caster yoke which forms a unitary type of support frame for each respective caster assembly of the set. Each caster yoke has mounted thereon a pivot assembly extending between an upper end and a lower end and defining a vertical axis extending therebetween. Each pivot assembly is attachable adjacent its upper end to the base of the object, and is attachable adjacent its opposite lower end to the caster yoke to permit swiveling movement of the caster yoke about the vertical axis. One or more wheel assemblies are attachable to the caster yoke for free rotation about a horizontal axis that is transverse to the vertical axis. One or more caster components are selected from a group of caster components consisting of a swivel brake lock assembly, a wheel brake lock assembly, and a trim cover assembly and each such caster component is mountable after such selection on a respective caster yoke of the set, such that the one or more caster components selected and mounted on at least one of the caster yokes may be different than the one or more caster components selected and mounted on at least one other of said caster yokes of the set. In this manner, the same form of caster yoke may be used to form caster assemblies having differing caster components and respectively different functionalities.

In accordance with a yet further aspect of the present invention, there is provided a plurality of identical caster yokes in a set of an equal plurality of wheeled caster assemblies. Each one of said plurality of caster assemblies comprises: i) a respective one of said plurality of caster yokes; ii) a pivot assembly being attachable to the respective one caster yoke for swiveling movement of the respective one caster yoke about a vertical axis; iii) one or more wheel assemblies attachable to said respective one caster yoke for free rotation about a horizontal axis transverse to said vertical axis; and, iv) one or more caster components selected from a group of caster components consisting of a swivel brake lock assembly, a wheel brake lock assembly, and a trim cover assembly, with the one or more caster components selected and mounted on the respective one caster yoke being different than the one or more caster components selected and mounted on at least one other of the plurality of caster yokes of the set.

Other advantages, features and characteristics of the present invention, as well as methods of operation and functions of the related elements of the structure, and the combination of parts and economies of manufacture, will become more apparent upon consideration of the following detailed description of several non-limiting embodiments and the appended claims with reference to the accompanying drawings, the latter of which is briefly described hereinbelow.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which non-limiting embodiments of the invention are illustrated by way of example. It is expressly understood, however, that the drawings are for the purpose of illustration and description only, and are not intended as a definition of the limits of the invention. In the accompanying drawings:

FIG. 2A depicts a front perspective view. FIG. 2B depicts a side view. FIG. 2C depicts a rear perspective view. FIG. 2D depicts a bottom perspective view. FIG. 2E depicts a top plan view.

FIG. 4A depicts an exploded view. FIG. 4B depicts a side view;

FIG. 5A depicts an exploded view. FIG. 5B depicts a side view.

Figure 1A:
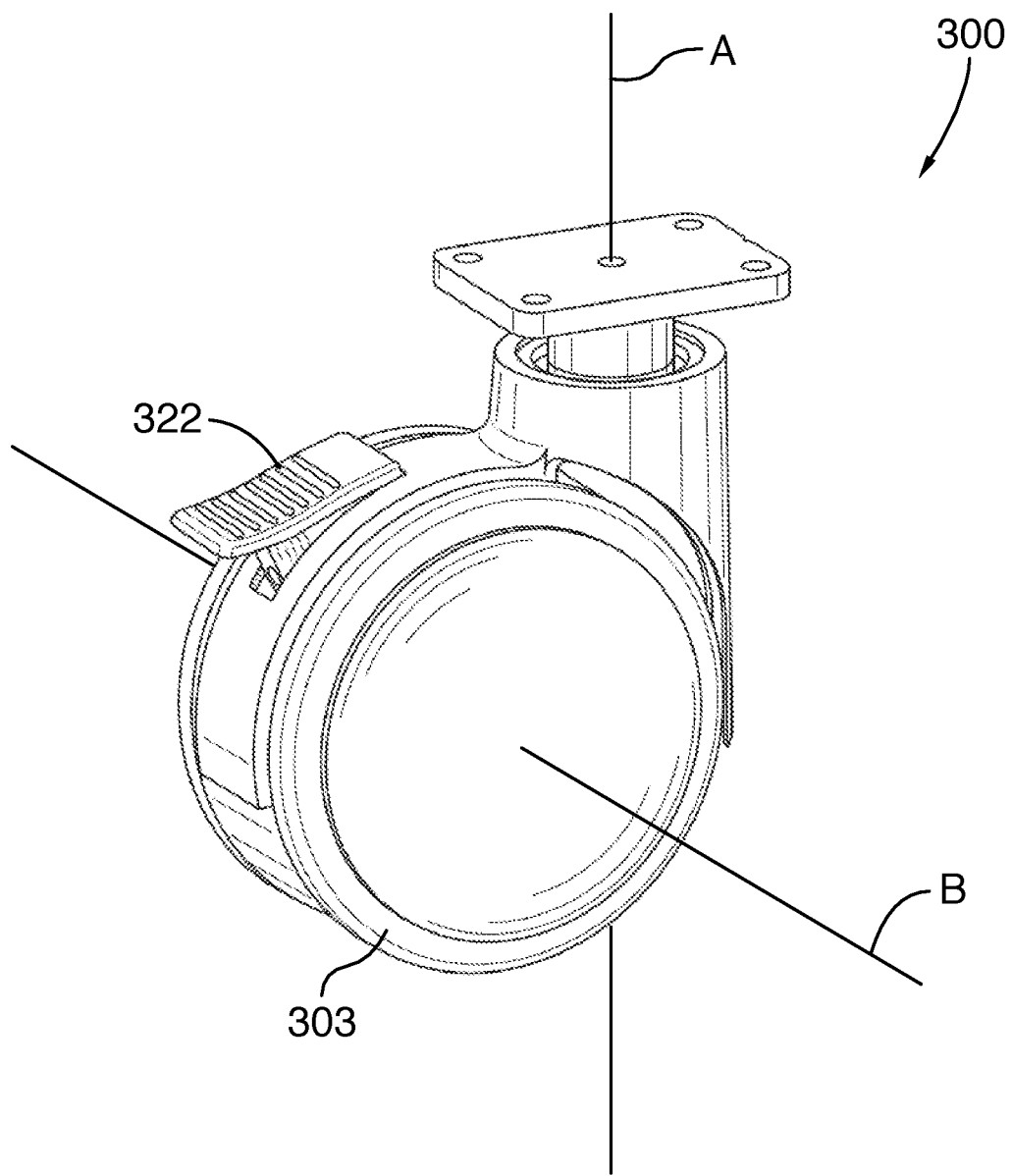
FIGS. 1A, 1B and 1C (SHEETS 1 TO 3 OF 16 SHEETS) depict perspective views of embodiments of a set of caster assemblies having a first wheeled caster assembly (depicted in FIG. 1A), a second wheeled caster assembly (depicted in FIG. 1B), and a third wheeled caster assembly (depicted in FIG. 1C)

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

Figure 1B:
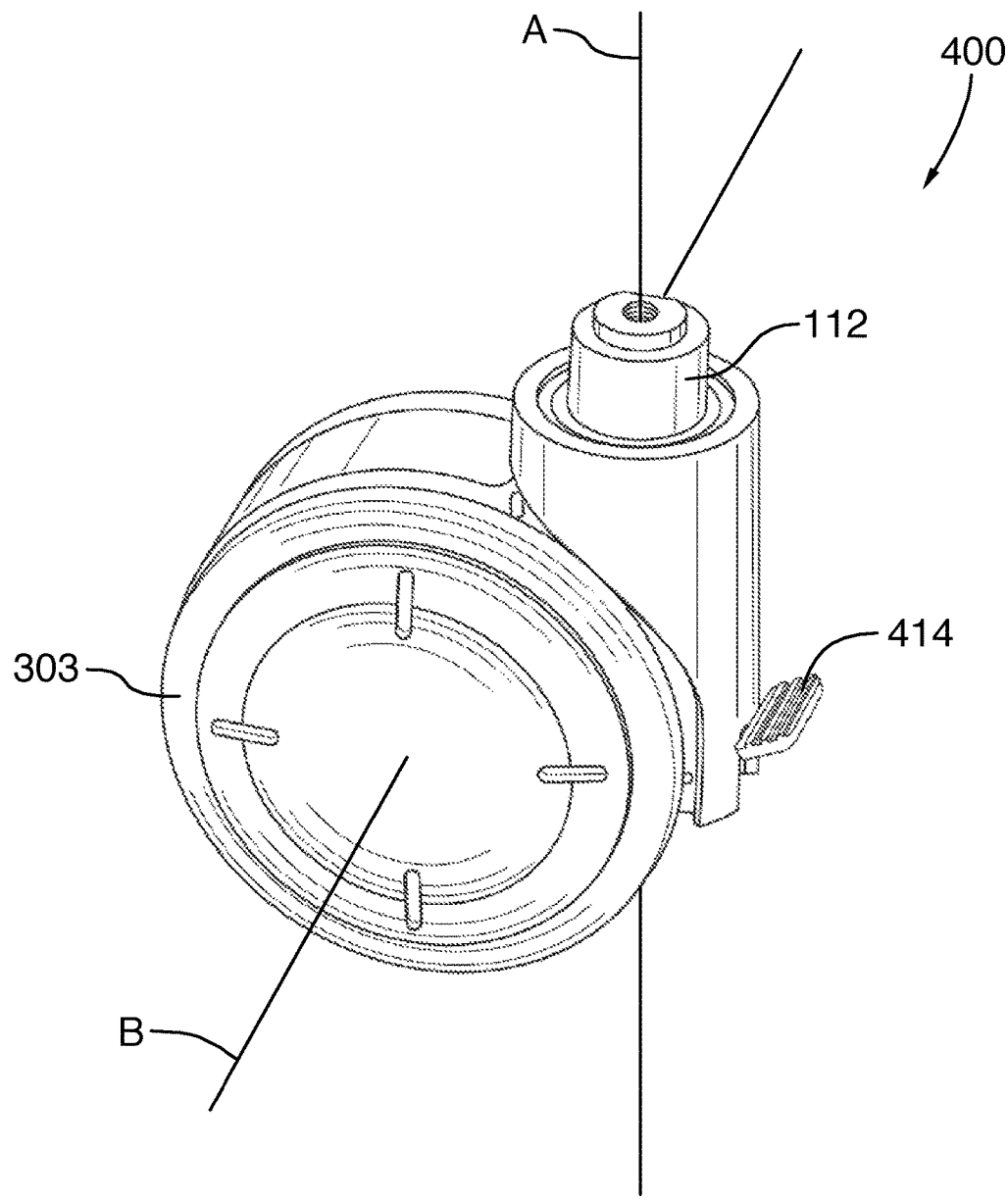
Figure 1C:
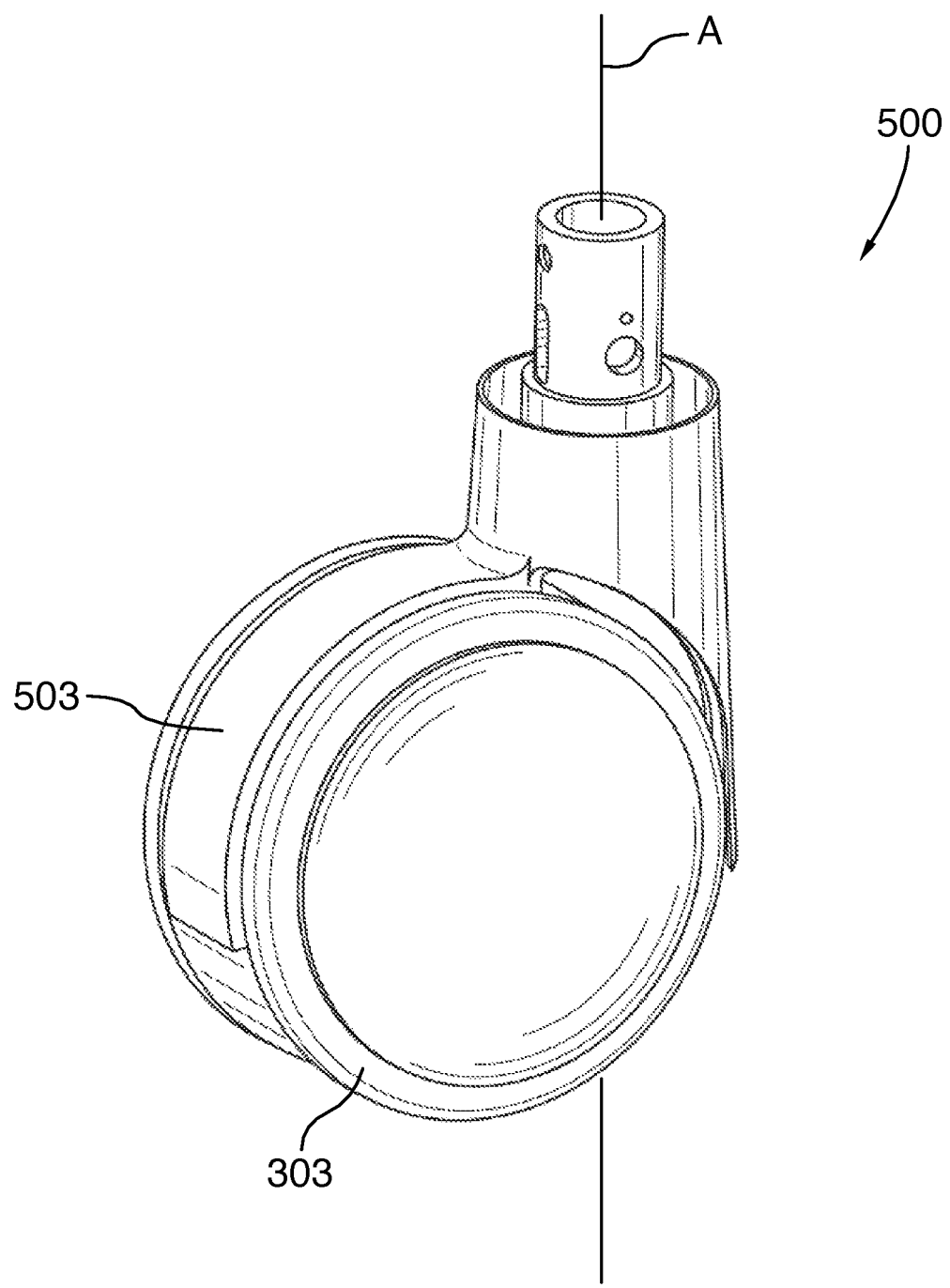
Figure 2A:
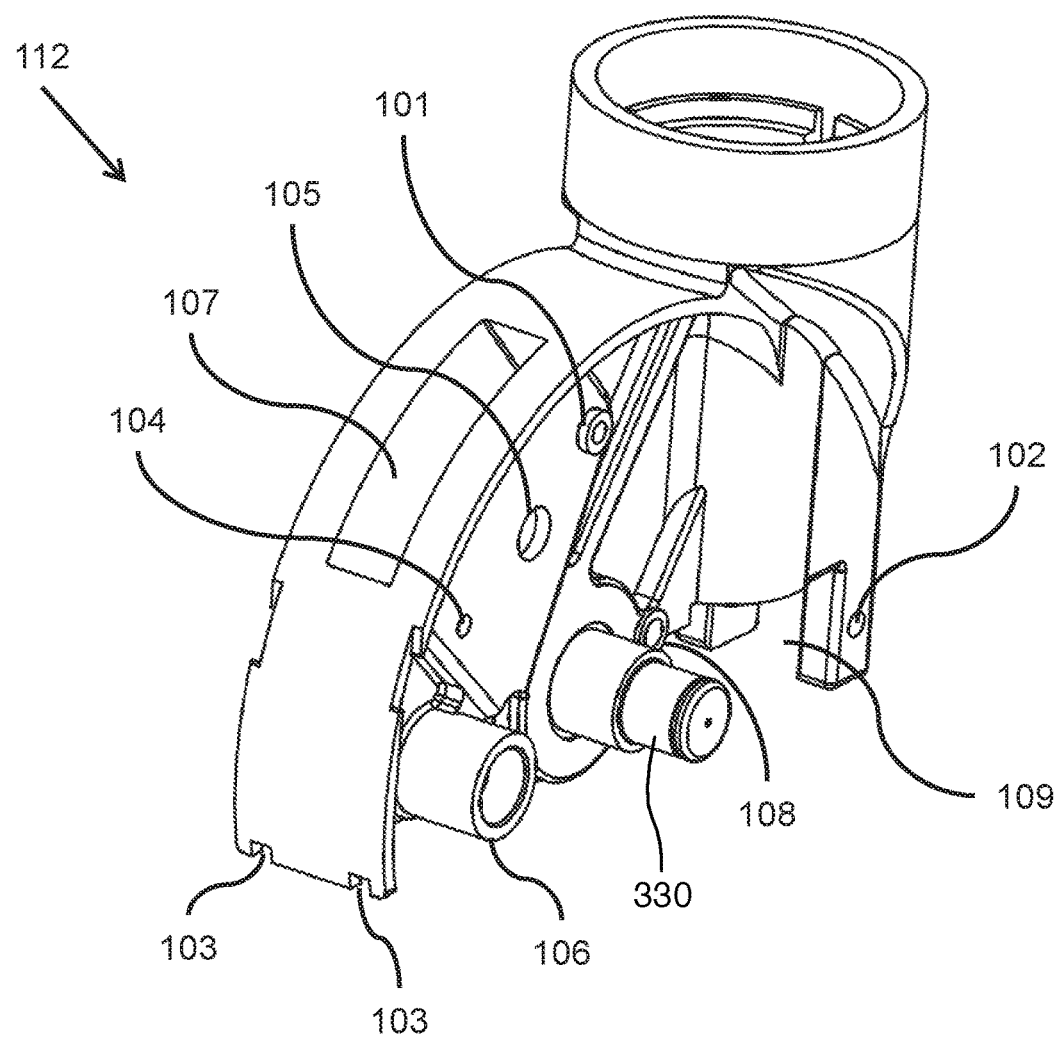
FIGS. 2A, 2B, 2C, 2D and 2E (SHEETS 4 TO 8 OF 16 SHEETS) depict different views of a caster yoke commonly deployed with (used in the construction of) any one of the first wheeled caster assembly, the second wheeled caster assembly and the third wheeled caster assembly of FIGS. 1A, 1B and 1C, respectively.
Figure 2B:
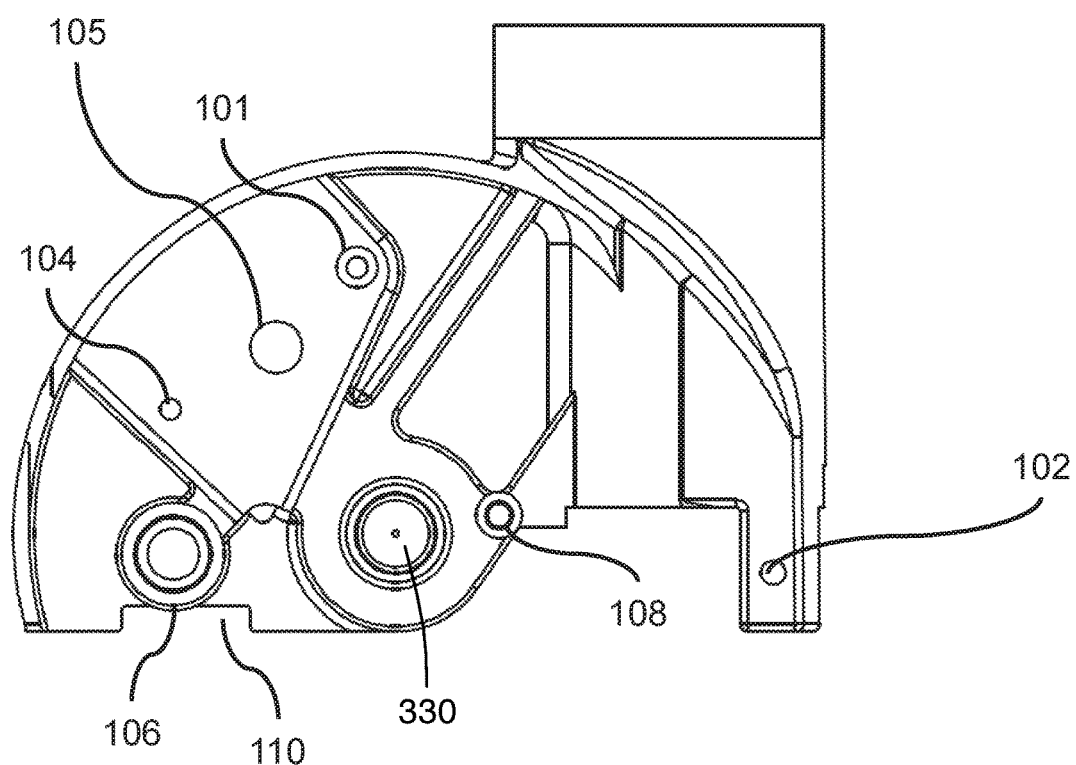
Figure 2C:
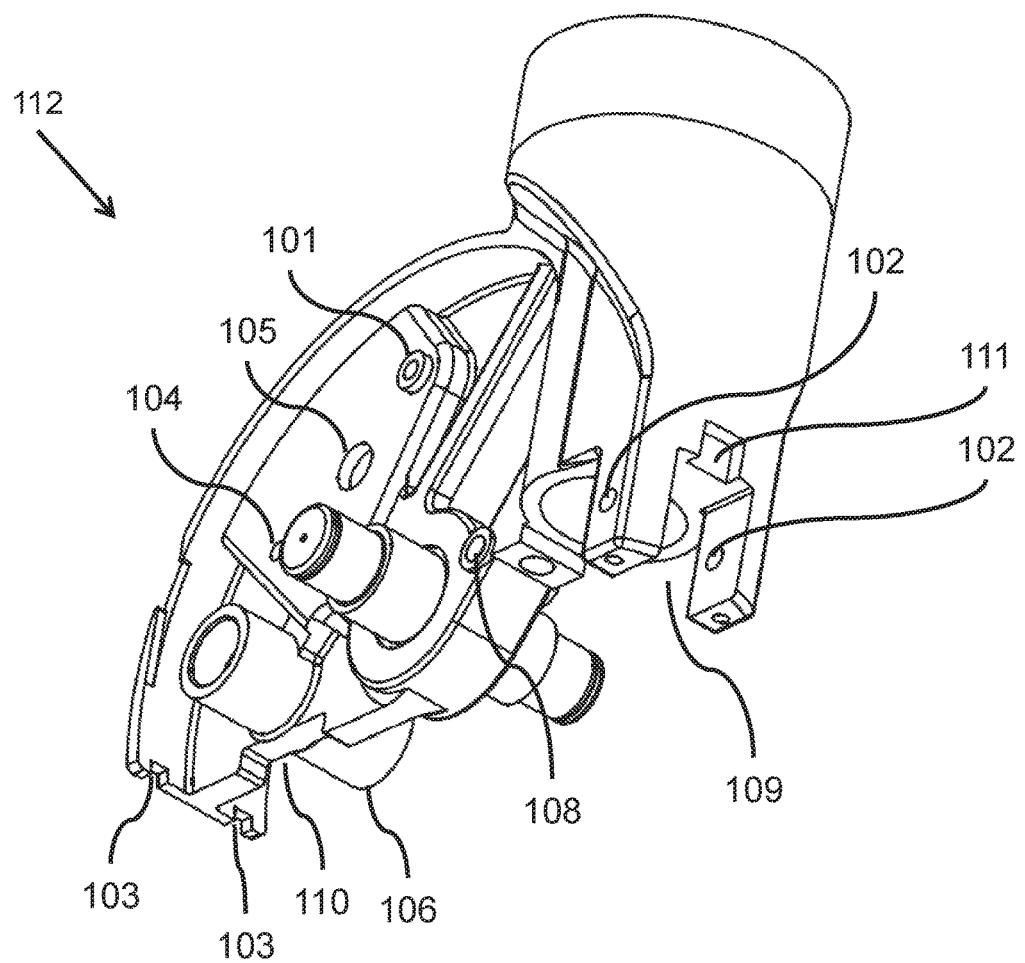
Figure 2D:
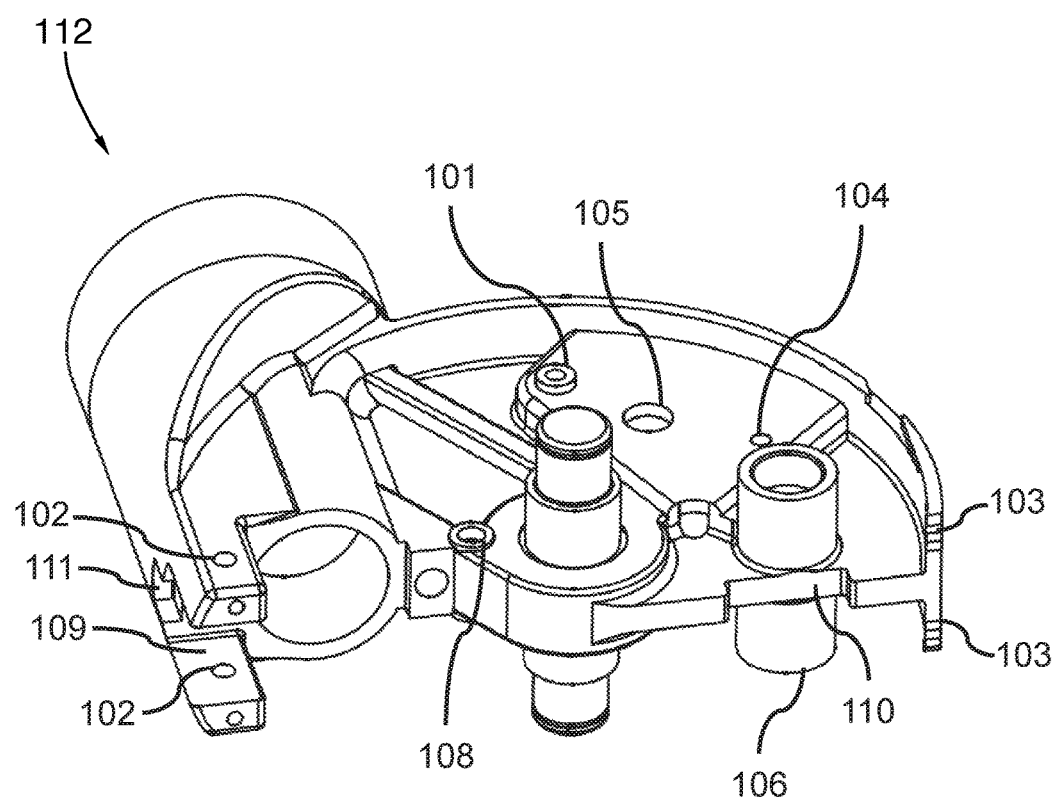
Figure 2E:
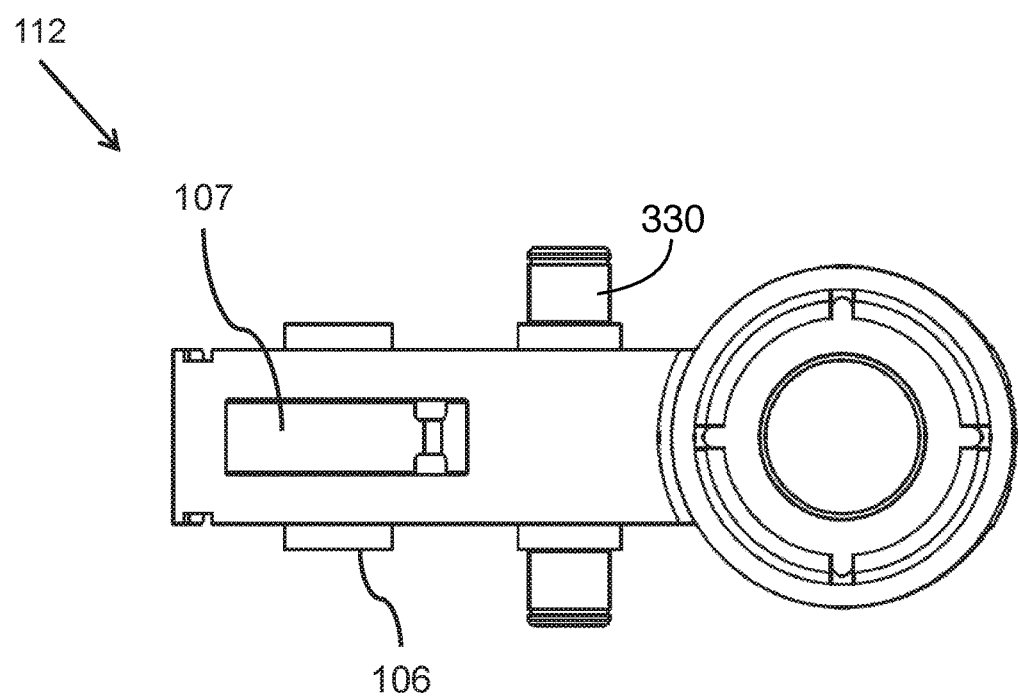

FIGS. 1A, 1B and 1C depict views of embodiments of a set of caster assemblies having a first wheeled caster assembly 300 (depicted in FIG. 1A), a second wheeled caster assembly 400 (depicted in FIG. 1B), and a third wheeled caster assembly 500 (depicted in FIG. 1C). FIG. 1A depicts a perspective view. FIG. 1B depicts a perspective view. FIG. 1C depicts a perspective view. Each of the caster assemblies of FIGS. 1A, 1B and 1C have different functional capabilities from one another by reason of there being different caster components (selected from a common pool of mountable structural components) selectively mounted on a caster yoke 112 member that is common to all 3 embodiments.

Figure 3A:
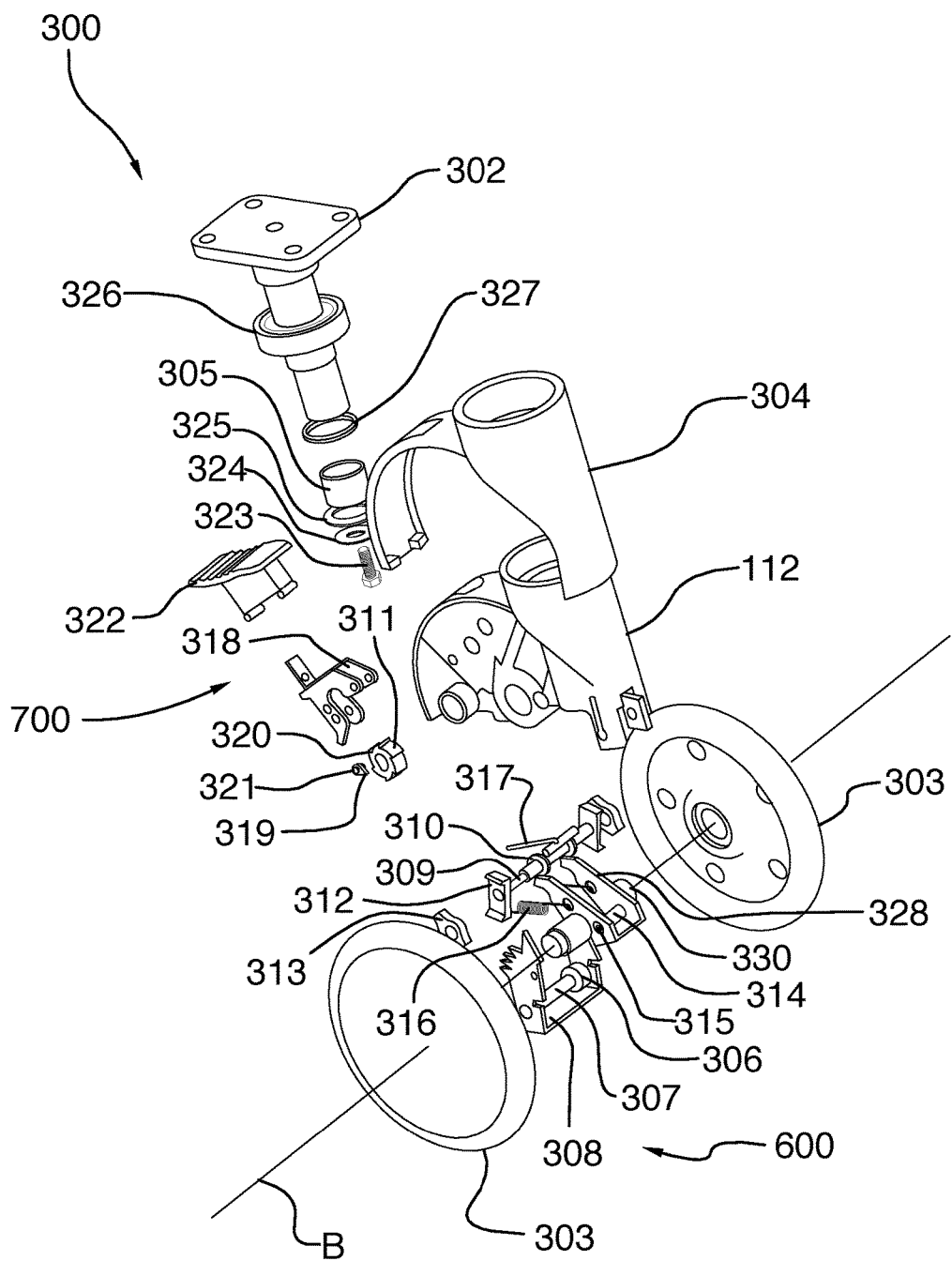
FIGS. 3A to 3D (SHEETS 9 TO 12 OF 16 SHEETS) depict views of the first wheeled caster assembly of FIG. 1A which includes the caster yoke of FIGS. 2A, 2B, 2C, 2D and 2E.
Figure 3B:
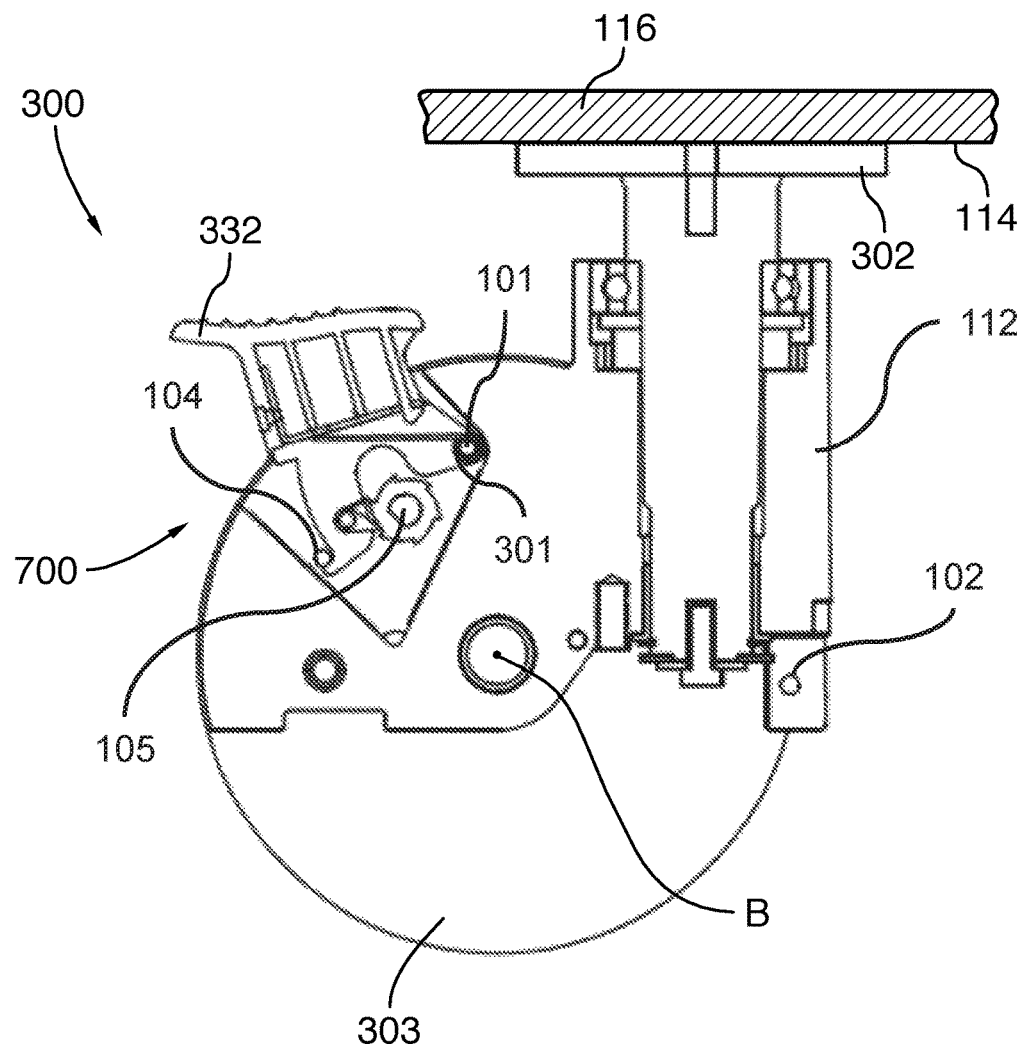

The first wheeled caster assembly 300, the second wheeled caster assembly 400, and the third wheeled caster assembly 500 are members of a set of caster assemblies 300, 400 and 500 that are each attachable to the base 114 of an object 116 by known fastening means and modalities to facilitate movement of the object 116, which base 114 and object 116 are for ease of illustration only depicted in FIG. 3B.

Each of the first wheeled caster assembly 300, the second wheeled caster assembly 400, and the third wheeled caster assembly 500 includes a caster yoke 112, depicted in each one of FIGS. 2A to 2E. The caster yoke is preferably formed (from a metal alloy, for instance) as a unitary central support frame for the caster assembly and the various caster components mounted thereon, as described more fully below. Thus, the caster yoke 112 is an important common element of (deployed in) each one of the caster assemblies that forms a set of caster assemblies. A technical effect (result or benefit) of using the same type of caster yoke 112 to form a set of caster assemblies is a reduction, at least in part, in the cost of manufacturing any one of the first wheeled caster assembly 300, the second wheeled caster assembly 400, and the third wheeled caster assembly 500 for use as a set of caster assemblies wherein each caster assembly may have different functionality, as compared to using different caster yokes which require differently constructed caster yokes and caster components for mounting thereon to provide for different caster assembly functionalities, as is the custom in the prior art.

It will be appreciated that by allowing different wheeled-caster components to be selectively mounted on a single iteration of caster yoke 112, selected types of caster components having corresponding caster functions may be selectively mounted on any one of the caster component assemblies in a set of caster assemblies, thus lending significant design flexibility to the set of caster components as a whole, and at significantly lower design and build cost. Such types of caster components may include, without limitation, a wheel brake lock assembly 700 to stop the rotation of the wheel(s) 303 of the caster assembly on which it is mounted about its rotational axis, being horizontal axis "B", a swivel brake lock assembly 600 to allow the caster assembly on which it is mounted to selectively rotate about a vertical axis "A" and to be held at one or more selected swivel positions, and a trim cover assembly 503, which trim cover assemblies are mounted on the caster yoke 112 to improve the overall appearance thereof and to prevent dust and other contaminants from entering the interior of the caster assembly so as to facilitate cleaning and maintenance of the caster assembly.

Thus, by using utilizing the same caster yoke 112 for constructing different types of caster assemblies, the cost of manufacturing and making available all of these different types of caster assemblies (such as, the first wheeled caster assembly 300 depicted in FIG. 3A, the second wheeled caster assembly 400 depicted in FIG. 4A, and the third wheeled caster assembly 500 depicted in FIG. 5A) may be reduced (at least in part), since these caster assemblies share the same form of caster yoke 112 and common caster components. By deploying the same form of caster yoke 112 and common caster components in each of the different caster assemblies, each of the caster assemblies does not need a separately designed, constructed and stocked caster yoke, which caster yoke is a key component in the construction of caster assemblies and potentially the largest, heaviest and most expensive to manufacture component of each such caster assembly. Accordingly, the improved caster yoke 112 disclosed herein permits unique functional capabilities for different sorts of caster assemblies (depending on the functionality desired for a particular wheeled caster assembly). In this manner, the caster yoke 112 of the present invention may be deployed to construct a set of caster assemblies that has a relatively large number of possible wheeled-caster configurations and related functionalities. Moreover, these various types (models) of caster assemblies can be advantageously mixed in a set of caster assemblies to be attached to the base of an object (equipment) to facilitate movement thereof in a controlled manner as specified (required) by the manufacturer of the object (equipment).

The first wheeled caster assembly 300, the second wheeled caster assembly 400 and the third wheeled caster assembly 500 are each configured for attachment in a conventional manner (either directly or indirectly) to the base 114 of an object 116 (being conventional equipment that is only partially depicted in FIG. 3B, only). In this manner, the first wheeled caster assembly 300, the second wheeled caster assembly 400 and the third wheeled caster assembly 500 are each configured to enable the object to be moved (along a working surface). Embodiments of the object include (and are not limited to) a bed, a stretcher, a gurney, an office chair, large medical diagnostic equipment, a palette, a wagon, a cart, and the like.

The first caster assembly 300, the second caster assembly 400, and the third caster assembly 500 preferably each have unique functional capabilities relative to each other. For example: the first caster assembly 300 has a wheel brake lock assembly 700 mounted on the caster yoke 112 for locking and unlocking rotation of the wheel assemblies 303 about a horizontal axis B under the control of brake pedal 322; the second caster assembly 400 has a swivel brake lock assembly 600 selectively mounted on the caster yoke 112 for locking and unlocking swivelling rotation of the caster assembly 400 about a vertical axis "A" under control of the swivel lock pedal 406; and the third caster assembly 500 has a trim cover assembly 503 mounted on the caster yoke 112 for improving its appearance and maintenance requirements.

As seen in FIGS. 2A to 2E, the caster yoke 112 is for construction of a set of caster assemblies (as depicted in, for example, FIGS. 1A, 1B and 1C). The set of caster assemblies includes (and is not limited to) the first wheeled caster assembly 300 of FIG. 1A, the second wheeled caster assembly 400 of FIG. 1B, and the third wheeled caster assembly 500 of FIG. 1C. Each caster assembly of the set utilizes some form of the caster yoke 112, and at least one member of the set of caster assemblies has different functional capability relative to each other member of the set. The caster yoke 112 includes mounting features (such as, a first mounting feature 101, a second mounting feature 102 and a third mounting feature 103, etc.). The mounting features of the caster yoke 112 are substantially identical as between the various caster yokes 112 included in the different caster assemblies of the set, and are configured to mount with respective caster components of the caster assemblies 300, 400, 500 as depicted in FIGS. 1A, 1B, and 1C, respectively. These caster components consist of the following group of caster components: a swivel brake lock assembly (designated by the general reference numeral 700); a wheel brake assembly (designated by the general reference numeral 600); and, a trim cover assembly (designated by the reference numeral 503). Any one or more of these caster components may be selected, either alone or in combination, from the aforesaid group of caster components for mounting on a respective caster yoke 112 of the caster assemblies 300, 400 and 500 to impart unique functional capabilities to the respective caster assembly.

Referring to the embodiment depicted in FIG. 3B, a first mounting feature 101 of the caster yoke 112 is configured to selectively mount a first caster component 301 of the first wheeled caster assembly 300, being part of the wheel brake lock assembly 700.

Figure 4A:
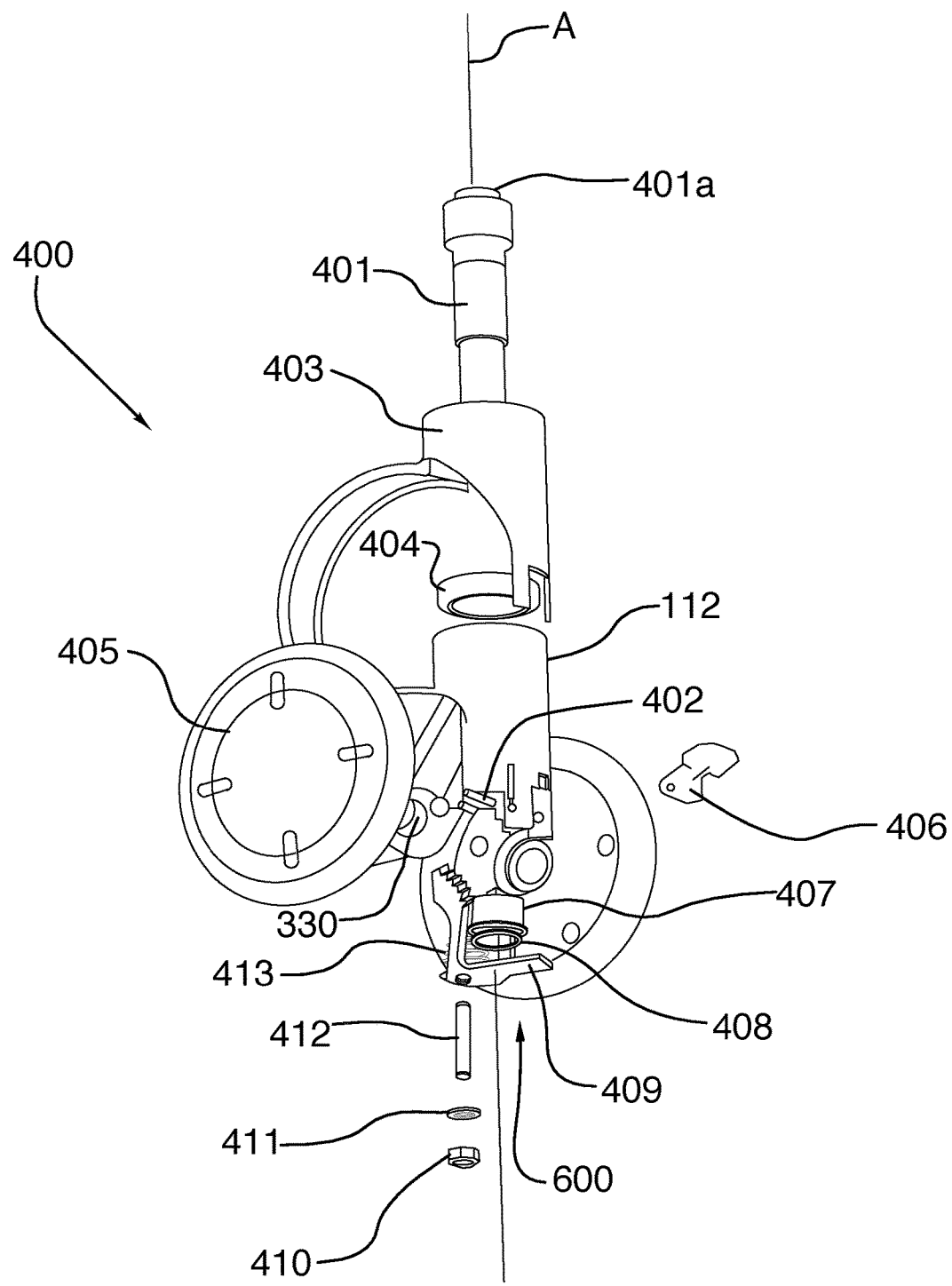
FIGS. 4A and 4B (SHEETS 13 AND 14 OF 16 SHEETS) depict views of the second wheeled caster assembly of FIG. 1B, and the second wheeled caster assembly includes the caster yoke of FIGS. 2A, 2B, 2C, 2D and 2E.
Figure 4B:
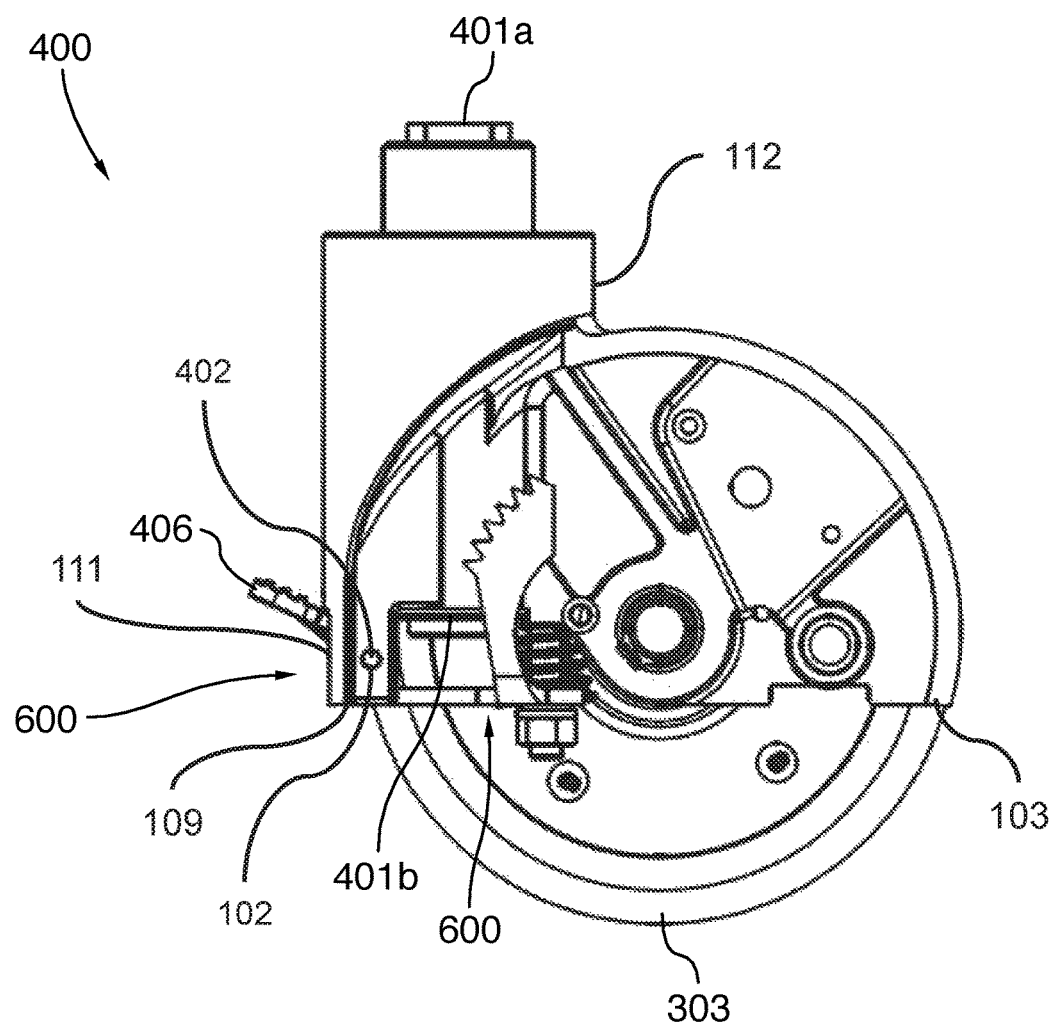

Referring to the embodiment depicted in FIG. 4B, a second mounting feature 102 of the caster yoke 112 is spaced apart from the first mounting feature 101. The second mounting feature 102 is configured to selectively mount a second caster component 402 of the second wheeled caster assembly 400, being part of the swivel brake lock assembly 600.

Figure 5A:
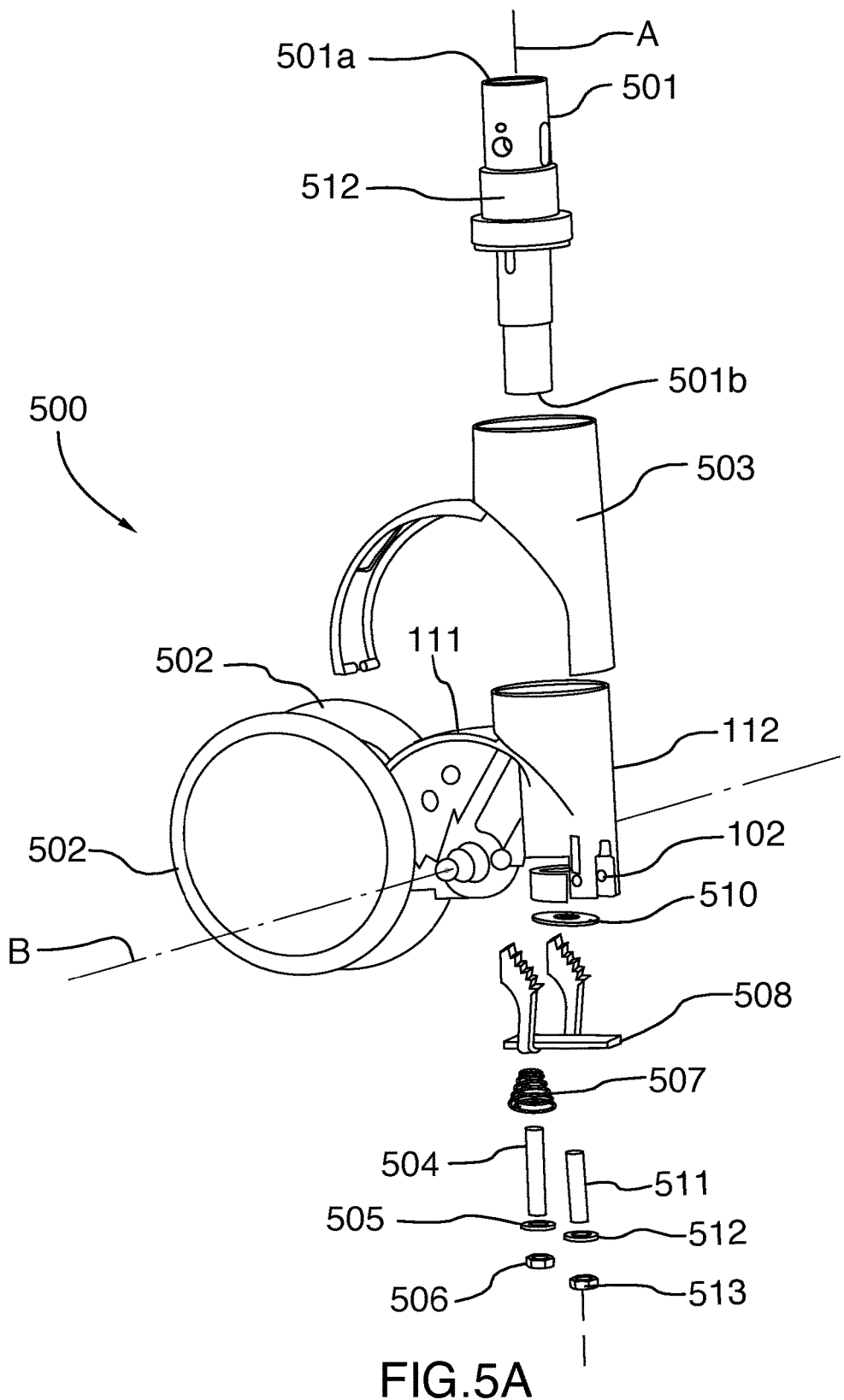
FIGS. 5A and 5B (SHEETS 15 AND 16 OF 16 SHEETS) depict views of embodiments of the third wheeled caster assembly of FIG. 1C, and the third wheeled caster assembly includes the caster yoke of FIGS. 2A, 2B, 2C, 2D and 2E.
Figure 5B:
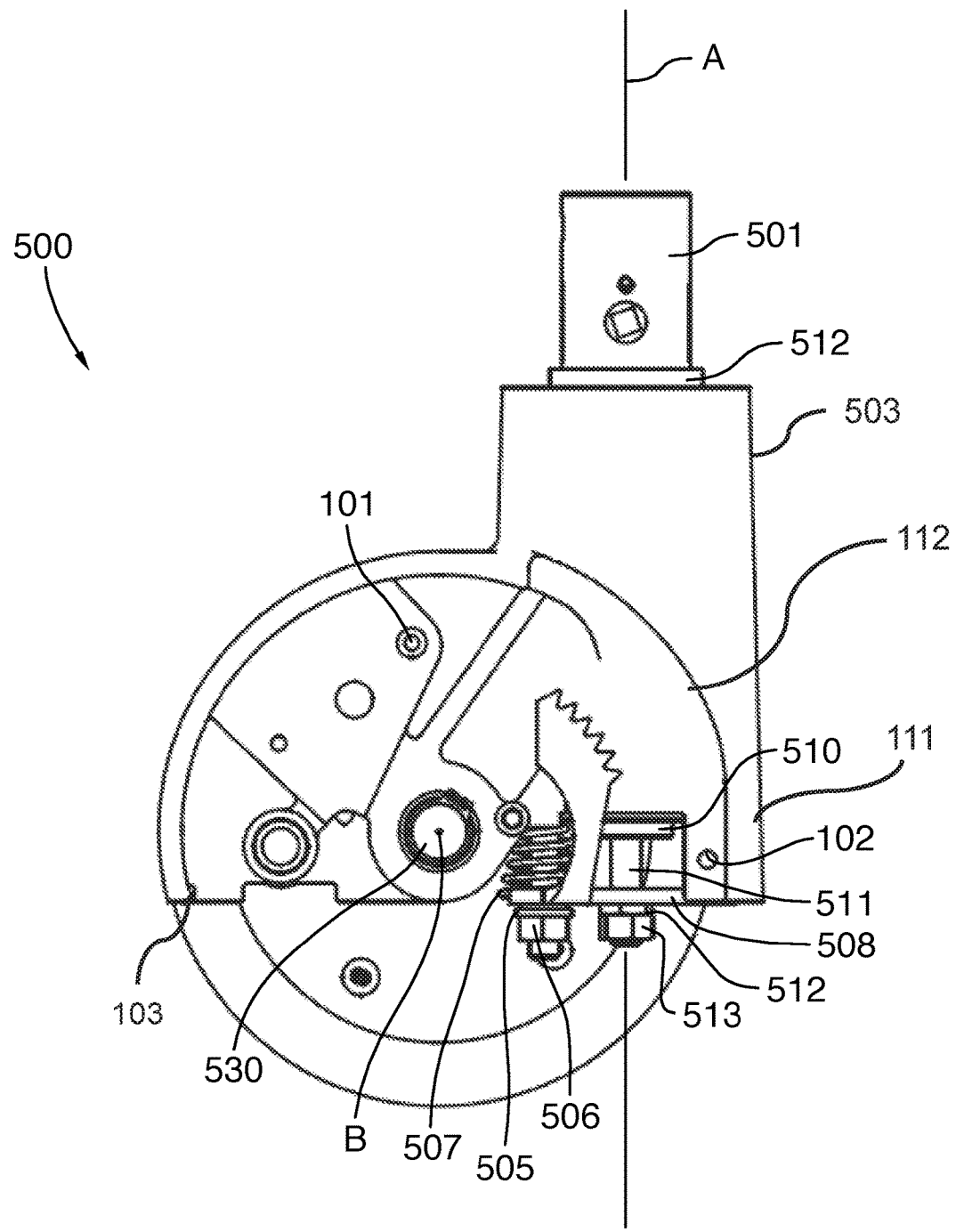

Referring to the embodiment depicted in FIG. 5B, a third mounting feature 103 of the caster yoke 112 is spaced apart from the first mounting feature 101 and is also spaced apart from the second mounting feature 102. The third mounting feature 103 is configured to selectively mount a third caster component 503 of the third wheeled caster assembly 500, being a part of the trim cover assembly.

Referring to the embodiments depicted in FIGS. 2A to 2E (in general terms), each of the mounting features 101 to 111 of the caster yoke 112 is configured to selectively mount (interface, receive, interact with) a selected component of any one of the caster assemblies 300, 400, 500 (depicted in FIGS. 1A, 1B, and 1C, respectively).

Specifically, the caster yoke 112 includes (provides) mounting features that are spaced apart from each other. The mounting features of caster yoke 112 include (and are not limited to): a first mounting feature 101, a second mounting feature 102, a third mounting feature 103, a fourth mounting feature 104, a fifth mounting feature 105, a sixth mounting feature 106, a seventh mounting feature 107, an eighth mounting feature 108, a ninth mounting feature 109, a tenth mounting feature 110, and an eleventh mounting feature 111.

It will be appreciated that the first mounting feature 101 may be utilized (or not) by any one of the caster assemblies (as depicted in FIGS. 1A, 1B and 1C). The first mounting feature 101 is configured to selectively mount a component of the first wheeled caster assembly 300 (as depicted in FIG. 3B). For instance, the first mounting feature 101 includes a pivot assembly (also called a pin extension, a protuberance, etc.), and any equivalent thereof, extending from the caster yoke 112. The first mounting feature 101 extends across opposite sidewalls of the caster yoke 112.

It will be appreciated that the second mounting feature 102 may be utilized by any one of the caster assemblies (as depicted in FIGS. 1A, 1B and 1C). The second mounting feature 102 is configured to selectively mount a component of the first wheeled caster assembly 300 (FIG. 3B). The second mounting feature 102 is configured to selectively mount a component of the second wheeled caster assembly 400 (FIG. 4B). For instance, the second mounting feature 102 includes a hole (a shaped void), and any equivalent thereof, defined on (formed in) opposite lateral sidewalls of the caster yoke 112 at a lower section of the caster yoke 112. The second mounting feature 102 is configured to receive a pin (a rod, a pin extension, etc.), and any equivalent thereof, provided by the component of any one of the first wheeled caster assembly 300 (FIG. 3A) or the second wheeled caster assembly 400 (FIG. 4A).

Figure 3C:
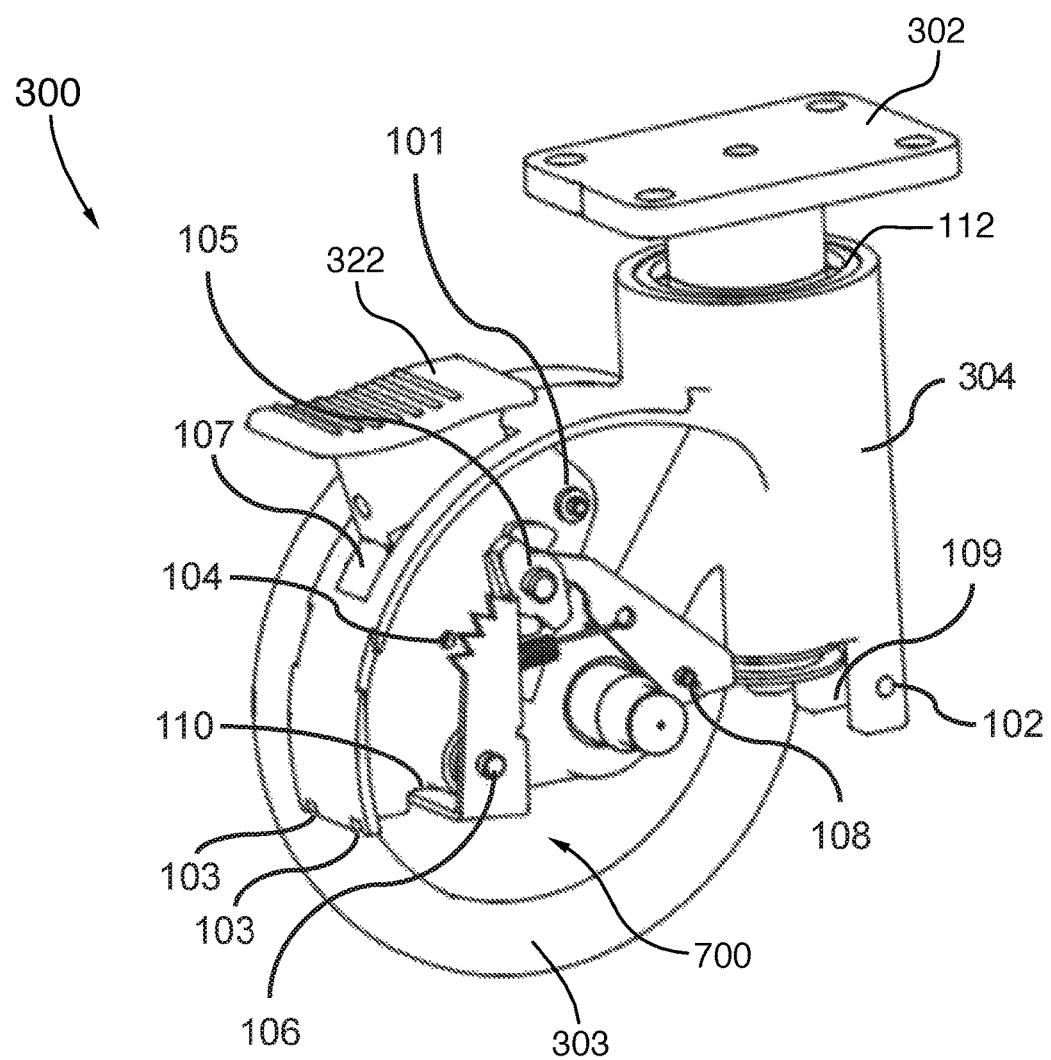

It will be appreciated that the third mounting feature 103 may be utilized by any one of the caster assemblies (as depicted in FIGS. 1A, 1B and 1C). The third mounting feature 103 is configured to selectively mount a component of the first wheeled caster assembly 300 (FIG. 3C). The third mounting feature 103 is configured to selectively mount a component of the second wheeled caster assembly 400 (FIG. 4B). The third mounting feature 103 is configured to selectively mount a component of the third wheeled caster assembly 500 (FIG. 5B). For instance, the third mounting feature 103 includes a slot, and any equivalent thereof, defined by (formed in) the caster yoke 112 (at a front portion of the caster yoke 112). The third mounting feature 103 is positioned at a frontal section of the caster yoke 112.

It will be appreciated that the fourth mounting feature 104 may be utilized by any one of the caster assemblies (as depicted in FIGS. 1A, 1B and 1C). The fourth mounting feature 104 is configured to selectively mount a component of the first wheeled caster assembly 300 (FIG. 3B). For instance, the fourth mounting feature 104 includes a hole, and any equivalent thereof, defined by (formed in) the caster yoke 112. The fourth mounting feature 104 is formed on opposite sidewalls of the caster yoke 112 in a middle zone of the caster yoke 112. The fourth mounting feature 104 extends across opposite lateral sidewalls of the caster yoke 112. The fourth mounting feature 104 is configured to receive a pin (rod, pin extension), and any equivalent thereof.

It will be appreciated that the fifth mounting feature 105 may be utilized by any one of the caster assemblies (as depicted in FIGS. 1A, 1B and 1C). The fifth mounting feature 105 is configured to selectively mount a component of the first wheeled caster assembly 300 (FIG. 3B). For instance, the fifth mounting feature 105 includes a hole, and any equivalent thereof, defined by (formed in) the caster yoke 112 (at a middle zone of the caster yoke 112). The fifth mounting feature 105 extends between opposite lateral sides (the opposite lateral sidewalls) of the caster yoke 112. The fifth mounting feature 105 is configured to receive a pin (a rod), and any equivalent thereof.

It will be appreciated that the sixth mounting feature 106 may be utilized by any one of the caster assemblies (as depicted in FIGS. 1A, 1B and 1C). The sixth mounting feature 106 is configured to selectively mount a component of the first wheeled caster assembly 300 (FIG. 3C). For instance, the sixth mounting feature 106 includes a pivot assembly, and any equivalent thereof, extending from the opposite lateral sidewalls of the caster yoke 112 at a frontal portion of the caster yoke 112.

It will be appreciated that the seventh mounting feature 107 may be utilized by any one of the caster assemblies (as depicted in FIGS. 1A, 1B and 1C). The seventh mounting feature 107 is configured to selectively mount a component of the first wheeled caster assembly 300 (FIG. 3C). For instance, the seventh mounting feature 107 includes an elongated slot, and any equivalent thereof, defined by (formed in) the caster yoke 112. The seventh mounting feature 107 is defined along an arched portion along a top section of the caster yoke 112. The seventh mounting feature 107 is configured to receive a pin (a rod, a pin extension), and any equivalent thereof. The seventh mounting feature 107 is located above the sixth mounting feature 106.

It will be appreciated that the eighth mounting feature 108 may be utilized by any one of the caster assemblies (as depicted in FIGS. 1A, 1B and 1C). The eighth mounting feature 108 is configured to selectively mount a component of the first wheeled caster assembly 300 (FIG. 3C). For instance, the eighth mounting feature 108 includes a hole, and any equivalent thereof, defined by (formed in) the caster yoke 112. The eighth mounting feature 108 is located along a bottom rear section of the caster yoke 112 on the opposite sidewalls thereof. The eighth mounting feature 108 is configured to receive a pin (a rod, a pin extension), and any equivalent thereof. The eighth mounting feature 108 is located rearward of the fourth mounting feature 104 along a lower rear zone of the caster yoke 112.

It will be appreciated that the ninth mounting feature 109 may be utilized by any one of the caster assemblies (as depicted in FIGS. 1A, 1B and 1C). The ninth mounting feature 109 is configured to selectively mount a component of the first wheeled caster assembly 300 (FIG. 3C). The ninth mounting feature 109 is configured to selectively mount a component of the second wheeled caster assembly 400 (FIG. 4B). For instance, the ninth mounting feature 109 includes a slot, and any equivalent thereof, defined by (formed in) the caster yoke 112. The ninth mounting feature 109 is located between a pair of pivot assemblies extending from a lower rear section of the caster yoke 112. The ninth mounting feature 109 is located behind the fourth mounting feature 104 along a lower rear zone of the caster yoke 112.

Figure 3D:
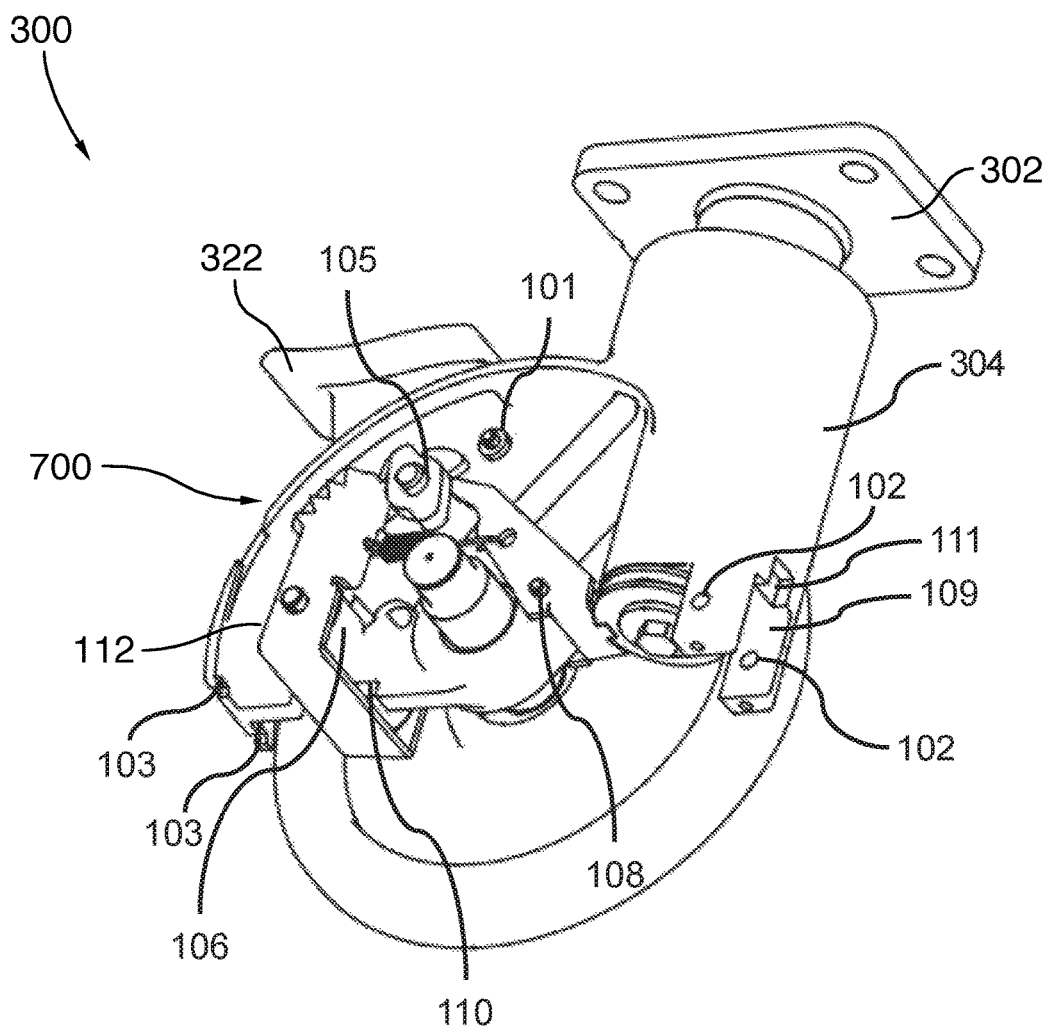

It will be appreciated that the tenth mounting feature 110 may be utilized by any one of the caster assemblies (as depicted in FIGS. 1A, 1B and 1C). The tenth mounting feature 110 is configured to selectively mount a component of the first wheeled caster assembly 300 (FIG. 3D). For instance, the tenth mounting feature 110 includes a notch, and any equivalent thereof, defined by (formed in) the caster yoke 112. The tenth mounting feature 110 is provided at a lower frontal section of the caster yoke 112. The tenth mounting feature 110 is located below the sixth mounting feature 106 along a lower edge of the caster yoke 112.

It will be appreciated that the eleventh mounting feature 111 may be utilized by any one of the caster assemblies (as depicted in FIGS. 1A, 1B and 1C). The eleventh mounting feature 111 is configured to selectively mount a component of the first wheeled caster assembly 300 (FIG. 3D). The eleventh mounting feature 111 is configured to selectively mount a component of the second wheeled caster assembly 400 (FIG. 4B). The eleventh mounting feature 111 is configured to selectively mount a component of the third wheeled caster assembly 500 (FIG. 5B). For instance, the eleventh mounting feature 111 includes a cavity, and any equivalent thereof, defined by (formed in) the caster yoke 112. The eleventh mounting feature 111 is defined at a rear lower section of the caster yoke 112. The eleventh mounting feature 111 is located above the ninth mounting feature 109.

FIGS. 3A to 3D depict views of embodiments of the first wheeled caster assembly 300 of FIG. 1A. The first wheeled caster assembly 300 includes the caster yoke 112 of any one of FIGS. 2A, 2B, 2C, 2D and 2E. FIG. 3A depicts an exploded view. FIG. 3B depicts a side view. FIG. 3C depicts a frontal perspective view. FIG. 3D depicts a rear perspective view.

The first wheeled caster assembly 300 includes a first caster component 301 (as depicted in FIGS. 3A and 3B). The caster yoke 112 includes the first mounting feature 101 (as depicted in FIGS. 2A, 2B, 2C, 2D, and 3B) configured to selectively mount the first caster component 301 of the first wheeled caster assembly 300.

In accordance with an embodiment of the present invention, the components of the first wheeled caster assembly 300 further include the first caster component 301, a second caster component 302, a third caster component 303 (such as, a wheel or a pair of wheels mounted on a common axle 330), a fourth caster component 304, a fifth caster component 305, a sixth caster component 306, a seventh caster component 307, an eighth caster component 308, a ninth caster component 309, a tenth caster component 310, an eleventh caster component 311, a twelfth caster component 312, a thirteenth caster component 313, a fourteenth caster component 314, a fifteenth caster component 315, a sixteenth caster component 316, a seventeenth caster component 317, an eighteenth caster component 318, a nineteenth caster component 319, a twentieth caster component 320, a twenty-first caster component 321, a twenty-second caster component 322, a twenty-third caster component 323, a twenty-fourth caster component 324, a twenty-fifth caster component 325, a twenty-sixth caster component 326, a twenty-seventh caster component 327, and a twenty-eighth caster component 328.

For instance, the first caster component 301 may include a main-cam pin. The first caster component 301 is configured to selectively mount the first mounting feature 101 of the caster yoke 112. For instance, the second caster component 302 may include a top plate assembly. For instance, the third caster component 303 may include a wheel assembly. The fourth caster component 304 may include a trim cover assembly. The fourth caster component 304 is configured to selectively mount the eleventh mounting feature 111 of the caster yoke 112. For instance, the fifth caster component 305 may include a bushing assembly. For instance, the sixth caster component 306 may include a flanged-bushing assembly (for the eighth caster component 308). For instance, the seventh caster component 307 may include a brake-arm pin. For instance, the eighth caster component 308 may include a brake-arm assembly. The eighth caster component 308 is configured to selectively mount the tenth mounting feature 110 of the caster yoke 112. The ninth caster component 309 may include a pin assembly. The ninth caster component 309 is configured to selectively mount the fifth mounting feature 105 of the caster yoke 112. The tenth caster component 310 includes a flanged bushing. The eleventh caster component 311 includes a main cam. The eleventh caster component 311 is configured to selectively mount the fifth mounting feature 105 of the caster yoke 112. The twelfth caster component 312 may include a center-locking cam. The thirteenth caster component 313 includes a brake cam. The fourteenth caster component 314 may include a center-lock bushing. The fifteenth caster component 315 includes a center-locking pin. The fifteenth caster component 315 is configured to selectively mount the eighth mounting feature 108 of the caster yoke 112. The sixteenth caster component 316 may include a center-locking spring. The seventeenth caster component 317 includes a torsion spring. The eighteenth caster component 318 may include a brake-system frame. The eighteenth caster component 318 is configured to selectively mount the fourth mounting feature 104 of the caster yoke 112. The nineteenth caster component 319 may include a push cam. The twentieth caster component 320 includes a push-cam spring. The twenty-first caster component 321 may include a push-cam pin. The twenty-second caster component 322 may include a wheel brake pedal. The twenty-second caster component 322 is configured to selectively mount the seventh mounting feature 107 of the caster yoke 112. The twenty-third caster component 323 includes a connector (a bolt). The twenty-fourth caster component 324 includes a washer. The twenty-fifth caster component 325 may include a locating washer. The twenty-sixth caster component 326 may include a bearing assembly. The twenty-seventh caster component 327 may include a retainer (retaining ring). The twenty-eighth caster component 328 may include a center-lock bracket.

FIGS. 4A and 4B depict views of embodiments of the second wheeled caster assembly 400 of FIG. 1B. The second wheeled caster assembly 400 also includes the caster yoke 112 of any one of FIGS. 2A, 2B, 2C, 2D and 2E. FIG. 4A depicts an exploded view. FIG. 4B depicts a side view.

The second wheeled caster assembly 400 includes a second caster component 402 (as depicted in FIGS. 4A and 4B). The caster yoke 112 includes the second mounting feature 102 (as depicted in FIGS. 2A, 2B, 2C, 2D and 4B) spaced apart from the first mounting feature 101. The second mounting feature 102 is configured to selectively mount the second caster component 402 of the second wheeled caster assembly 400.

The components of the second wheeled caster assembly 400 further include a first caster component 401, a second caster component 402, a third caster component 403 (being a trim cover assembly), a fourth caster component 404, a fifth caster component 405, a sixth caster component 406, a seventh caster component 407, an eighth caster component 408, a ninth caster component 409, a tenth caster component 410, an eleventh caster component 411, a twelfth caster component 412, and a thirteenth caster component 413 and a swivel brake lock assembly 600, with the latter being comprised of the caster components 402 to 413, inclusive.

The first caster component 401 comprises a pivot assembly extending between an upper 401a and a lower 401b end to define a vertical axis A extending therebetween. The pivot assembly 402 is attachable adjacent its upper end 401a by any conventional means to the base of an object to be made transportable by attachment of the set of casters to its base, and is attachable adjacent its lower end 401b to the caster yoke 112 for swiveling movement of the caster yoke 112 about the vertical axis A. The second caster component 402 may include a spring pin assembly. The second caster component 402 is configured to selectively mount the second mounting feature 102 of the caster yoke 112 to provide a means for mounting the sixth caster component, which is swivel lock pedal 406, on the caster yoke 112. In this manner, the second caster component 402 is configured to selectively mount the ninth mounting feature 109 of the caster yoke 112. The third caster component 403 may include a cover assembly. The third caster component 403 is configured to selectively mount the eleventh mounting feature 111 of the caster yoke 112. The fourth caster component 404 may include a bearing assembly to assist in mounting the pivot assembly 401 as aforesaid. The fifth caster component 405 includes a wheel assembly. The seventh caster component 407 includes a lower bushing assembly to assist in mounting the pivot assembly 401 as aforesaid. The eighth caster component 408 may include a retaining ring. The ninth caster component 409 may include a brake arm. The tenth caster component 410 includes a nut. The eleventh caster component 411 may include a washer. The twelfth caster component 412 includes a set screw. The thirteenth caster component 413 may include a spring assembly.

FIGS. 5A and 5B depict views of embodiments of the third wheeled caster assembly 500 of FIG. 1C. The third wheeled caster assembly 500 includes the caster yoke 112 of any one of FIGS. 2A, 2B, 2C, 2D and 2E. FIG. 5A depicts an exploded view. FIG. 5B depicts a side view.

The third wheeled caster assembly 500 includes a third caster component 503 in the form of a trim cover assembly (as depicted in FIGS. 5A and 5B). The caster yoke 112 may include the third mounting feature 103 (as depicted in FIGS. 2A, 2C, 2D and 5B) spaced apart from the first mounting feature 101 and from the second mounting feature 102. The third mounting feature 103 is configured to selectively mount the third caster component 503 of the third wheeled caster assembly 500 for retention on the caster yoke 112.

The components of the third wheeled caster assembly 500 further includes a first caster component 501, a second caster component 502, a third caster component 503, a fourth caster component 504, a fifth caster component 505, a sixth caster component 506, a seventh caster component 507, an eighth caster component 508, a ninth caster component 509, a tenth caster component 510, and an eleventh caster component 511.

The first caster component may include a pivot assembly 501, which includes an upper bearing assembly 512. The second caster component may include a wheel assembly 502 having two wheel members rotatable about common axle member 530 operatively mounted on the caster yoke 112. The third caster component 503 may comprise a trim cover assembly. The third caster component 503 is configured to be selectively mounted on/over the caster yoke 112. The third mounting feature 103 is configured to selectively fit with and to selectively mount a selected component of any one of the caster assemblies 300, 400, 500. The fourth caster component 504 may include a set screw. The fifth caster component 505 may include a washer. The sixth caster component 506 may include a nut. The seventh caster component 507 may include a set screw. The eighth caster component 508 may include a brake arm.

The ninth caster component 509 may include a lower bushing/bearing assembly. The tenth caster component 510 may include a retaining ring. The eleventh caster component 511 may include a set screw.

In use, after installation of a set of caster assemblies upon the base 114 of an object 116, a user is able to brake the rotation of the wheel assemblies 303 of the first embodiment of caster assembly illustrated in FIGS. 3A, 3B horizontal about axis B by depressing the brake pedal 322, which in turn activates the wheel brake assembly 700 to cause the components thereof (314 to 321) to move to a first configuration wherein they are in locking engagement with the wheel assemblies 303. A second depression of the brake pedal 322 causes the wheel brake assembly 700 to move from locking engagement with the wheel assemblies 303 to a second configuration, in which the wheel assemblies 303 are again free to rotate about axis B.

In use, after installation of a set of caster assemblies upon the base 114 of an object 116, a user is able to brake the swiveling movement of the caster yoke 112 about the pivot assembly 401 of the first embodiment of caster assembly as illustrated in FIGS. 4A and 4b about vertical axis A by downwardly depressing (pivoting) the free end of the swivel lock pedal 406, which in turn causes the remaining components of the swivel lock assembly 600 (407 to 413) to move upwardly to a first configuration wherein they arrestingly engage the lower end 401b of the pivot assembly 401 to restrain same from swiveling movement relative to the caste yoke 112. Subsequent upwardly directed return movement of the free end of the swivel brake pedal 406 causes the remaining components (407 to 413) of the swivel wheel brake assembly to move from said arresting engagement to their original configuration, wherein the pivot assembly 401 is again free to perform swilling movement relative to the caste yoke 112 about the vertical axis A.

This written description uses examples to disclose the invention and to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies, components, and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

I claim:

1. A plurality of identical caster yokes in a set of an equal plurality of wheeled caster assemblies, with each one of said plurality of caster assemblies comprising:
   i) a respective one of said plurality of caster yokes;
   ii) a pivot assembly being attachable to said respective one caster yoke for swivelling movement of said respective one caster yoke about a vertical axis:
   iii) one or more wheel assemblies attachable to said respective one caster yoke for free rotation about a horizontal axis transverse to said vertical axis; and,
   iv) one or more caster components selected from a group of caster components having different functionality and consisting of a swivel brake lock assembly, a wheel brake lock assembly, and a trim cover assembly, with the one or more caster components being uniquely selected from said group of caster components and thereafter being mounted on said respective one caster yoke so as to impart different functionality to said respective one caster yoke than is the case with the one or more caster components differently selected from said group of caster components and thereafter mounted on at least one other of said plurality of caster yokes of the set;
   wherein, each caster yoke of said plurality of caster yokes is integrally formed with eleven mounting features spaced apart from each other on opposite lateral sidewalls of the caster yoke, with said eleven mounting features comprising:
- a first mounting feature engageable with a first caster component that comprises a first part of said wheel brake lock assembly for selective mounting of said first part of said wheel brake lock assembly on each caster yoke of said plurality of caster yokes;
- a second mounting feature engageable with a second caster component that comprises a first part of said swivel brake lock assembly for selective mounting of said first part of said swivel brake lock assembly on each caster yoke of said plurality of caster yokes;
- a third mounting feature engageable with a third caster component that comprises a first portion of the trim cover assembly for selective attachment of said first portion of the trim cover assembly on each caster yoke of said plurality of caster yokes;
- a fourth mounting feature engageable with a fourth caster component that comprises a second part of said wheel brake lock assembly for selective mounting of said second part of said wheel brake lock assembly on each caster yoke of said plurality of caster yokes;
- a fifth mounting feature engageable with a fifth caster component that comprises a third part of said wheel brake lock assembly for selective mounting of said third part of said wheel brake lock assembly on each caster yoke of said plurality of caster yokes;
- a sixth mounting feature engageable with a sixth caster component that comprises a fourth part of said wheel brake lock assembly for selective mounting of said sixth caster component on each caster yoke of said plurality of caster yokes
- a seventh mounting feature engageable with a seventh caster component that comprises a fifth part of said wheel brake lock assembly for selective mounting of said fifth part of said wheel brake lock assembly on each caster yoke of said plurality of caster yokes;
- an eighth mounting feature engageable with an eighth caster component that comprises a second part of said swivel brake lock assembly for selective mounting of said second part of said swivel brake lock assembly on each caster yoke of said plurality of caster yokes;
- a ninth mounting feature engageable with a ninth caster component that comprises a third part of said swivel brake lock assembly for selective mounting of said third part of said swivel brake lock assembly on each caster yoke of said plurality of caster yokes;
- a tenth mounting feature engageable with a tenth caster component that comprises a sixth part of said wheel brake lock assembly for selective mounting of said sixth part of said wheel brake lock assembly on each caster yoke of said plurality of caster yokes; and
- an eleventh mounting feature engageable with an eleventh caster component that comprises a second portion of said trim cover assembly for selective attachment of said second portion of said trim cover assembly on each caster yoke of said plurality of caster yokes.

2. The plurality of caster yokes of claim 1, wherein the first part of the wheel brake lock assembly of each caster yoke of said plurality of caster yokes comprises a main-cam pin, and the first mounting feature of each caster yoke of said plurality of caster yokes comprises a throughpassage defined between the opposite lateral sidewalls of the caster yoke adjacent an upper frontal portion of the caster yoke, said throughpassage being configured and otherwise adapted to receive said main cam-pin in operatively retained relation within the throughpassage.

3. The plurality of caster yokes of claim 2, wherein the first part of said swivel brake lock assembly of each caster yoke of said plurality of caster yokes comprises a mounting pin, and the second mounting feature of each caster yoke of said plurality of caster yokes comprises a throughpassage defined between the opposite lateral sidewalls of the caster yoke adjacent a lower section of the caster yoke, said throughpassage being configured and otherwise adapted to receive said mounting pin in operatively retained relation within the throughpassage.

4. The plurality of caster yokes of claim 3, wherein the third mounting feature of each caster yoke of said plurality of caster yokes comprises a slot defined by the caster yoke adjacent a front portion of the caster yoke, which slot is adapted for mounting engagement by said first portion of the trim cover assembly.

5. The plurality of caster yokes of claim 4, wherein the second part of said wheel brake lock assembly of each caster yoke of said plurality of caster yokes is a pin which contacts a brake pedal of the wheel brake lock assembly to limit travel of said brake pedal in two opposed directions, and wherein the fourth mounting feature of each caster yoke of said plurality of caster yokes comprises a mounting socket defined in at least one of the opposite lateral sidewalls of each caster yoke in a middle zone of said caster yoke, said mounting socket being configured and otherwise adapted to receive and hold fast said pin against said travel of the brake pedal.

6. The plurality of caster yokes of claim 5, wherein the third part of said wheel brake lock assembly of each caster yoke of said plurality of caster yokes comprises a cam mounting pin, the fifth mounting feature comprises a throughpassage extending between the opposite lateral sidewalls of each caster yoke at a middle zone of the caster yoke, with said throughpassage being configured and otherwise adapted to operatively receive said cam mounting pin therein.

7. The plurality of caster yokes of claim 6, wherein the fourth part of the wheel locking brake of each caster yoke of said plurality of caster yokes comprises a pivot assembly, and the sixth mounting feature of each caster yoke of said plurality of caster yokes comprises a throughpassage defined between the opposite lateral sidewalls of the caster yoke at a frontal portion of the caster yoke, said throughpassage being configured and otherwise adapted to receive said pivot assembly in operative retained relation therein.

8. The plurality of caster yokes of claim 7, wherein the seventh mounting feature of each caster yoke of said plurality of cater yokes comprises an elongated slot defined by the caster yoke, which slot extends along an arched portion of a top section of the caster yoke, with said brake pedal extending through said elongated slot.

9. The plurality of caster yokes of claim 8, wherein the eighth mounting feature of each caster yoke of said plurality of caster yokes comprises a throughpassage defined between the opposite lateral sidewalls of the caster yoke adjacent a lower rear section of the caster yoke, said throughpassage being configured and otherwise adapted to receive a pin for operative mounting of said second part of said swivel brake lock assembly on the eighth mounting feature.

10. The plurality of caster yokes of claim 9, wherein the ninth mounting feature of each caster yoke of said plurality of caster yokes comprises a slot defined between a pair of pivot assemblies extending downwardly from a lower rear section of the caster yoke, said slot being engageable by said third part of said swivel brake lock assembly to facilitate said selective mounting of said third part of said swivel brake lock assembly on said plurality of caster yokes.

11. The plurality of caster yokes of claim 10, wherein the tenth mounting feature of each caster yoke of said plurality of caster yokes comprises a notch defined adjacent a lower frontal section of each caster yoke, and wherein the sixth part of said wheel brake lock on each caster yoke of said plurality of caster yoke assemblies comprises a brake-arm assembly engageable with said notch.

12. The plurality of caster yokes of claim 11, wherein the eleventh mounting feature of each caster yoke of said plurality of caster yokes comprises a cavity formed in the caster yoke adjacent a rear lower section of the caster yoke which casting is engageable as aforesaid by said second portion of said trim cover assembly for said selective attachment of the second portion of the trim cover on each caster yoke of said plurality of caster yokes.

\* \* \* \* \*